(12) United States Patent
Liu et al.

(10) Patent No.: US 6,940,848 B1
(45) Date of Patent: Sep. 6, 2005

(54) VOICE OVER IP MOBILITY IN IP/CELLULAR NETWORKS INTERWORKING

(75) Inventors: Jen-chi Liu, Hsinchu (TW); Wanjiun Liao, Taipei (TW)

(73) Assignee: Industrial Technology Research Inst., Hsinchu (TW)

(*) Notice: Subject to any disclaimer, the term of this patent is extended or adjusted under 35 U.S.C. 154(b) by 861 days.

(21) Appl. No.: 09/606,248

(22) Filed: Jun. 29, 2000

(30) Foreign Application Priority Data

May 5, 2000 (TW) .................................... 89108586 A

(51) Int. Cl.⁷ .............................................. H04L 12/66
(52) U.S. Cl. .................... 370/352; 370/338; 455/432.1
(58) Field of Search ................................ 370/352, 328, 370/329, 331, 400, 401, 410, 395.2, 310, 338; 455/432.1, 433, 435.1, 436, 437, 440

(56) References Cited

U.S. PATENT DOCUMENTS

| | | | | |
|---|---|---|---|---|
| 6,400,950 B1 * | 6/2002 | Patel et al. | ............... | 455/435.1 |
| 6,424,638 B1 * | 7/2002 | Ray et al. | ............... | 370/331 |
| 6,519,242 B1 * | 2/2003 | Emery et al. | ............... | 370/338 |
| 6,603,849 B2 * | 8/2003 | Lin et al. | ............... | 379/221.01 |
| 6,611,516 B1 * | 8/2003 | Pirkola et al. | ............... | 370/352 |
| 6,658,253 B1 * | 12/2003 | Berggren et al. | ............... | 455/444 |
| 2002/0058507 A1 * | 5/2002 | Valentine et al. | ............... | 455/433 |
| 2003/0119500 A1 * | 6/2003 | Mukherjee et al. | ............... | 455/433 |

OTHER PUBLICATIONS

Wanjiun Liao, Jen–Chi Liu, VoIP Mobility in IP/Cellular Network Internetworking, Apr. 2000, pp. 2–8, IEEE Communications Magazine.

* cited by examiner

*Primary Examiner*—Brian Nguyen
(74) *Attorney, Agent, or Firm*—Bacon & Thomas, PLLC

(57) ABSTRACT

A mobile host is connected to a communication terminal through a first mobile switching center of a cellular network, a first gateway at a near end of the Internet, and a second gateway at a far end of the Internet. When the mobile host roams from an area controlled by the first mobile switching center to an area controlled by a second mobile switching center, a comparison is done between the first gateway connected to the first mobile switching center and a third gateway that is connected to the second mobile switching center. If the third gateway and the first gateway are different, the third gateway invokes a call transfer procedure to the first gateway to establish a connection between the second gateway and the third gateway, and release a connection between the first gateway and the second gateway.

9 Claims, 3 Drawing Sheets

VOICE OVER IP MOBILITY IN IP/ CELLULAR NETWORKS INTERWORKING

BACKGROUND OF THE INVENTION

1. Field of the Invention

The present invention relates to the field of network interworking and, more particularly, to a method and system for providing mobile voice communication via the Internet and cellular networks.

2. Description of Related Art

Internet telephony, also known as voice over Internet protocol (abbreviated as voice over IP, or simply VoIP), is provided to deliver real time, two-way, synchronous voice traffic over the Internet or corporate Intranets. Furthermore, because of the increasing demand of mobile communication, the VoIP mobility has become an important issue. One of the existing activities in the international standards bodies towards VoIP mobility is the ITU-T Study Group (SG) 16 H.323 Mobile Annex, which addresses mobility issues in layer 2, timers, header compression, the H.323 system architecture, terminal mobility, user mobility and service mobility, so as to provide mobile voice communication over internet.

FIG. 3 shows a typical infrastructure of a hybrid IP/Cellular network and its major components. Assume that a mobile host 321 in a cellular network 32 would like to call a corresponding mobile host 331 in another cellular network 33. Conventionally, the call connection is established by connecting the mobile host 321 to an associated mobile switching center (MSC) 324 via a base station (BS) 322 and a base station controller (BSC) 323, so as to connect to the public switch telephone network (PSTN) 35. The call connection path is further directed to a mobile switching center 334 of the cellular network 33, and thus to the mobile host 331 via a base station controller 333 and a base station 332. Therefore, the call connection path among those networks can be indicated as MSC-PSTN-MSC. Furthermore, the H.323gateway (GW) 311 in the Internet 31 performs signaling conversion, and hence allows the call to be operated across different cellular networks 32 and 33. Under the current version of H.323, the signals are relayed through the PSTN 35 to the H.323 gateway 311. Therefore, the interoperability to cellular networks defined in the current H.323standard can be depicted by the path of MSC-PSTN-GW-PSTN-MSC. This is inefficient because the paths have to go through the circuit-switching PSTN 35, which results in the call occupying too much communication bandwidth. As a result, the communication cost is relatively high.

To solve the aforementioned problem, one would like to direct the paths through the packet-switching Internet 31, instead of the PSTN 35. However, this is not applicable, as the H.323 standard can not satisfy the mobility requirement of the mobile communication. For example, when the mobile host 321 roams from the MSC area controlled by the mobile switching center 324 to another MSC area controlled by a mobile switching center in the cellular network 33, the call connection will be broken, as the H.323 standard does not support the required handoff procedure. Therefore, there is a need for the above mobile voice communication to be improved.

SUMMARY OF THE INVENTION

One object of the present invention is to provide a mobile voice communication method that utilizes the existing communication standard to achieve a handoff procedure in the Internet, so as to effectively offer VoIP mobility support.

Another object of the present invention is to provide a mobile voice communication system that simply utilizes the existing network components to effectively offer VoIP mobility support.

According to one aspect, the present invention which achieves the objects relates to a mobile voice communication method for enabling a mobile host to proceed a voice call with a communication terminal via Internet and cellular networks. The mobile host is connected to the communication terminal through a first mobile switching center of the cellular network, a first gateway at a near end of the Internet, and a second gateway at a far end of the Internet. When the mobile host roams from an area controlled by the first mobile switching center to an area controlled by a second mobile switching center, the method compares the first gateway that is connected to the first mobile switching center with a third gateway that is connected to the second mobile switching center. If the comparison result indicates that the third gateway and the first gateway are different, the third gateway invokes a call transfer procedure to the first gateway to establish a connection between the second gateway and the third gateway, and release a connection between the first gateway and the second gateway.

According to another aspect, the present invention which achieves the objects relates to a mobile voice communication system for enabling a mobile host to proceed a voice call with a communication terminal via Internet and cellular networks. The system has a plurality of mobile switching centers provided by the cellular network for enabling the mobile host to establish a communication connection. The system further has a plurality of gateways provided by the Internet for connecting to the mobile switching centers. The mobile host is connected to the communication terminal through a first mobile switching center of the cellular network, a first gateway at a near end of the Internet, and a second gateway at a far end of the Internet. When the mobile host roams from an area controlled by the first mobile switching center to an area controlled by a second mobile switching center, and the first gateway that is connected to the first mobile switching center is different from a third gateway that is connected to the second mobile switching center, the third gateway invokes a call transfer procedure to the first gateway, so as to establish a connection between the second gateway and the third gateway, and release a connection between the first gateway and the second gateway.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
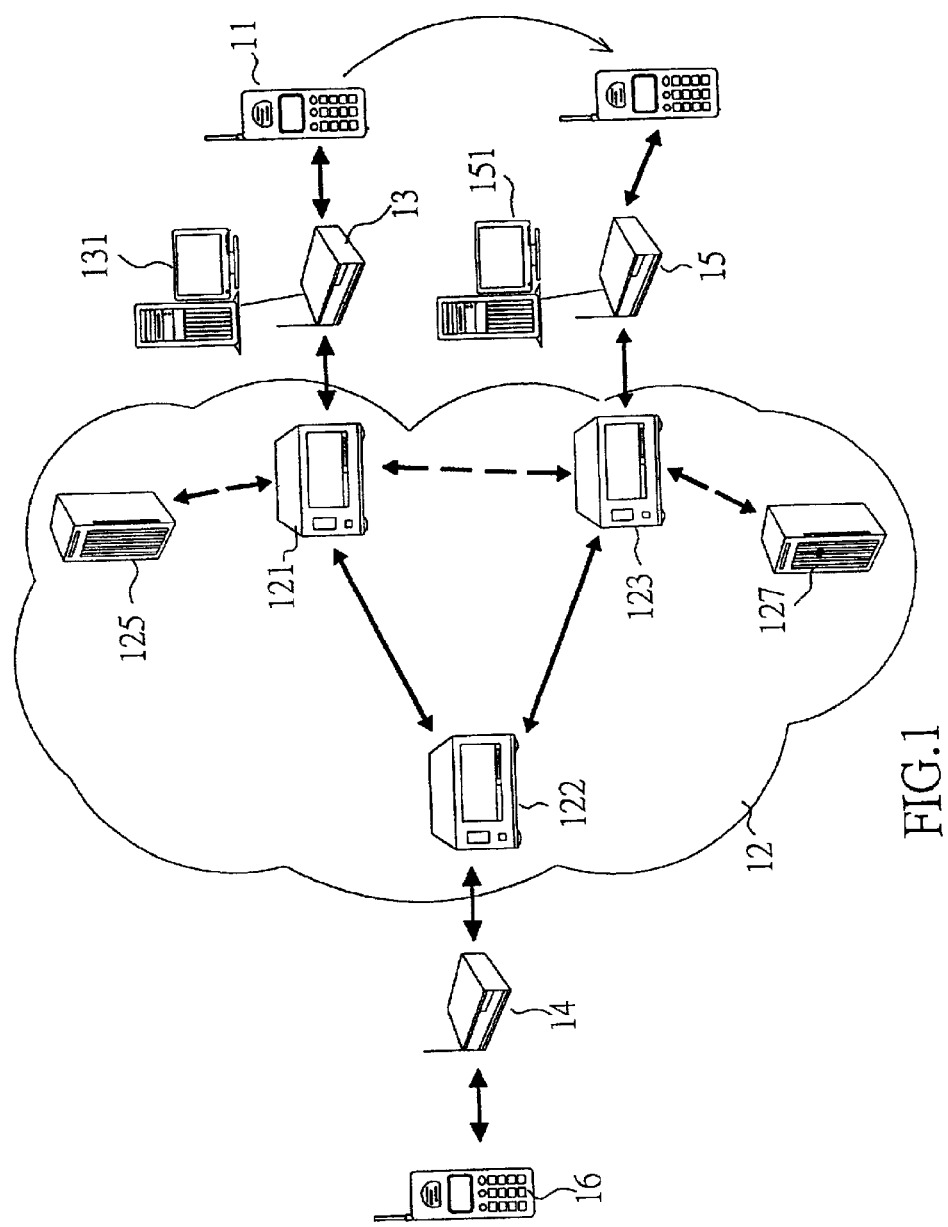
FIG. 1 schematically illustrates a mobile voice communication system in accordance with the present invention for establishing call connections.

With reference to FIG. 1, there is shown a mobile voice communication system in accordance with the present invention for establishing call connections. As shown, a mobile host 11 is connected to another mobile host 16 or other communication terminals via the Internet 12 for proceeding voice communication. The mobile host 11 is located in a MSC area controlled by a MSC 13 of a cellular network, and is connected to a MSC 14 associated with the mobile host 16 through the MSC 13, a gateway 121 at a near end of the Internet 12, and a gateway 122 at a far end of the Internet 12, so as to establish a call connection for the voice communication.

Figure 2:
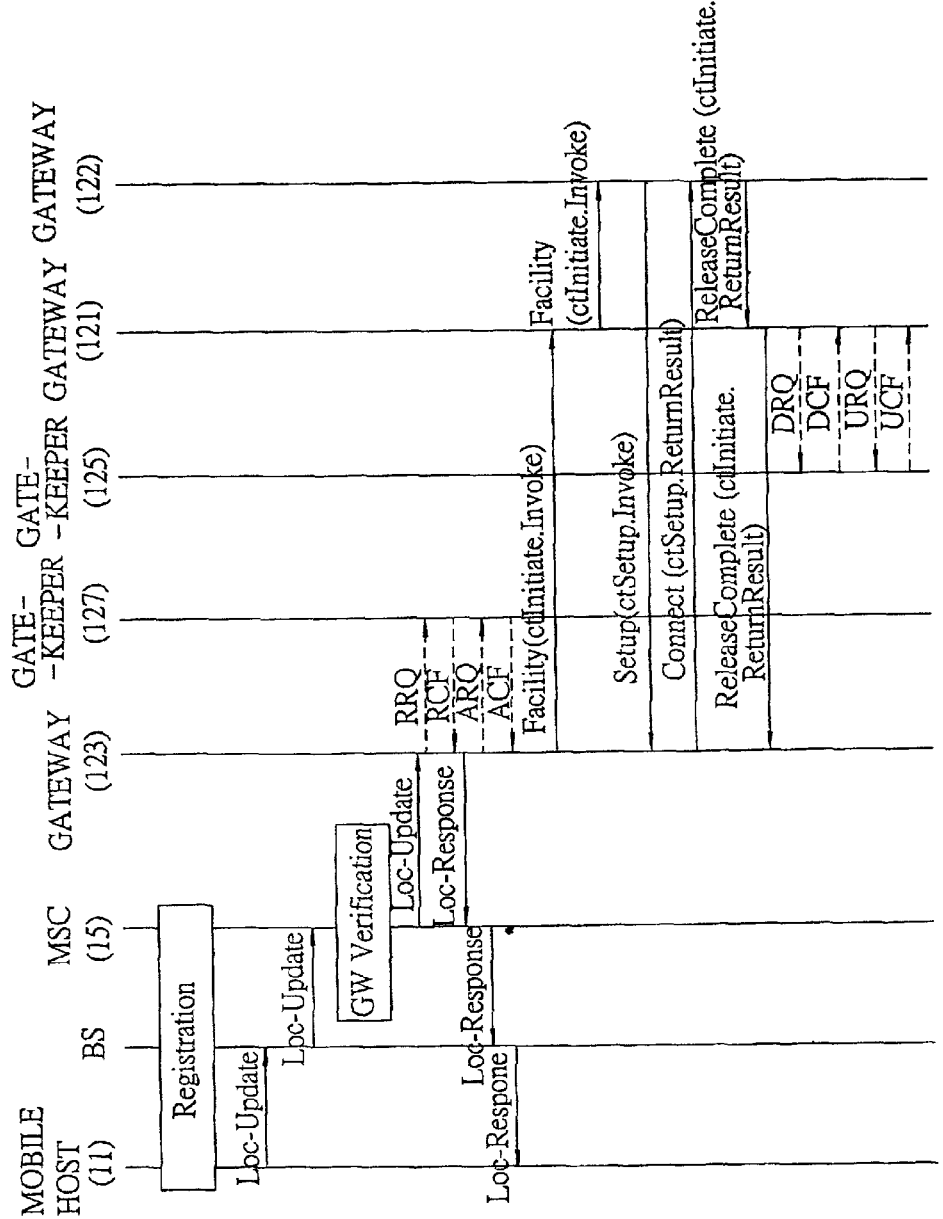
FIG. 2 is the message flow in accordance with the mobile voice communication method of the present invention.
Figure 3:
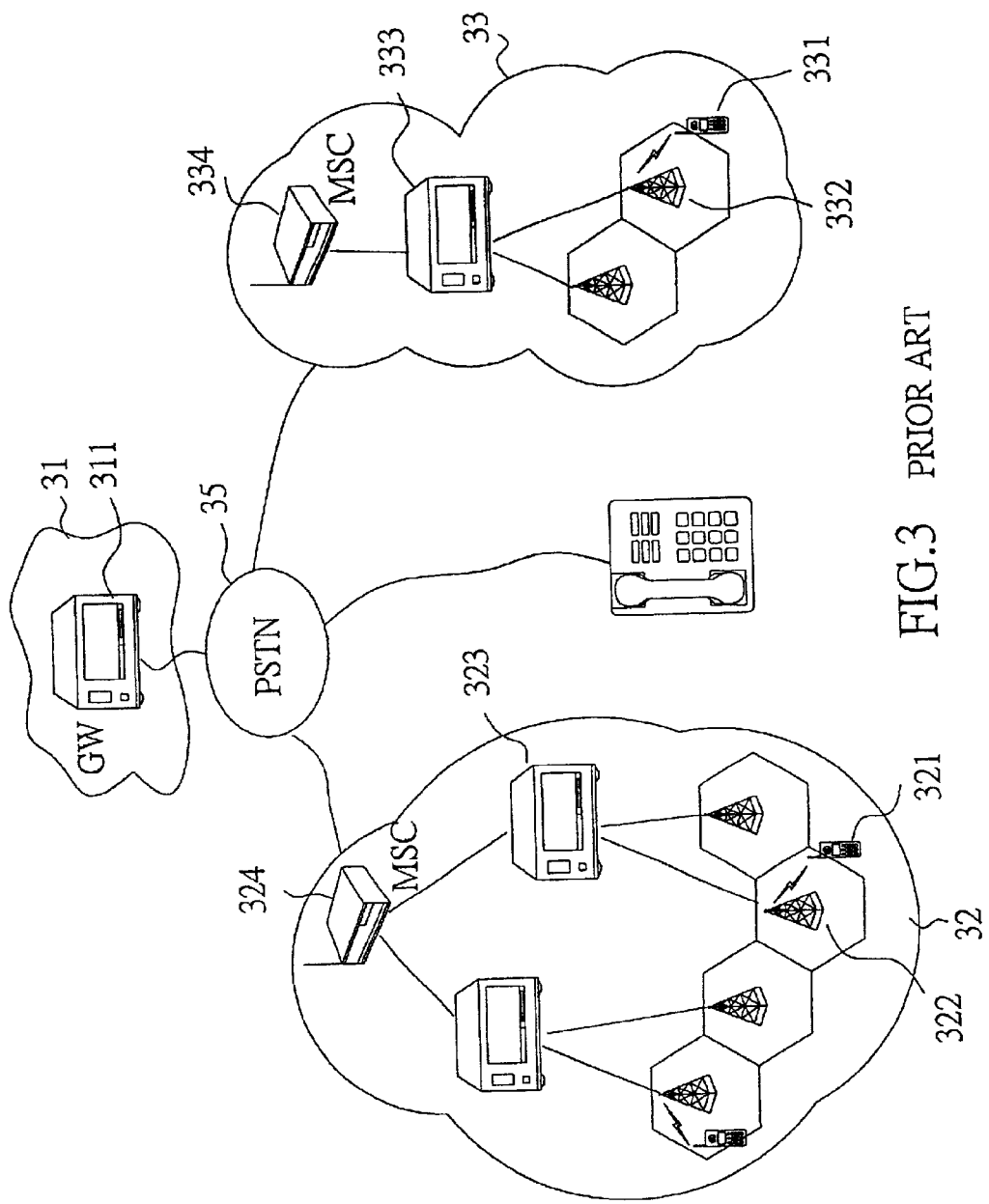
FIG. 3 schematically illustrates a typical infrastructure of a hybrid IP/Cellular network and its major components.

When the mobile host 11 is roaming from the MSC area controlled by the MSC 13 to that by a MSC 15, a location update is performed, as shown in FIG. 2. First, as in a regular roaming procedure, the mobile host 11 performs a registration process to the MSC 15 and then sends a location update request, denoted by Loc-Update, to the MSC 15, so as to update the location information of the mobile host 11 stored in the location register (home location register/visitor location register, HLR/VLR) 151 of the MSC 15.

Upon receipt of the location update request, the MSC 15 has to execute a gateway verification procedure to compare its directly connected gateway 123 in the Internet 12 with the gateway 121 associated with the mobile host 11 stored in the location register 131 of the MSC 13. If both are identical, it means that the mobile host 11 still stays in the area associated with the same gateway, and no extra operation other than regular location update for mobile communication is required to keep the voice communication in connection.

If the comparison result indicates that the gateway 123, which directly connected to the MSC 15, is different from the gateway 121, a handoff procedure must be performed in the Internet to keep the voice communication in connection. To initiate the handoff procedure, the MSC 15 sends a location update indication, denoted by Loc-Update, with the information of the previous gateway 121 to the directly associated gateway 123. The gateway 123 then initiates RRQ/RCF (Registration ReQuest/Registration ConFirmation) and ARQ/ACF (Admission ReQuest/Admission ConFirmation) exchanges with a gatekeeper 127, if the gatekeeper 127 is operatively connected to the gateway 123, so as to register the information for establishing call connection and acquire the required resources.

The handoff procedure is achieved in such a manner that the gateway 123 sends a facility message, denoted by Facility(ctInitiate.Invoke), for invoking a call transfer supplementary service to the previous gateway 121 of the mobile host 11. Upon receipt of this facility message, the gateway 121 starts a call transfer procedure to the gateway 122 at the far end, asking for a call transfer to the gateway 123. That is, the gateway 121 sends a facility message with call transfer initiate invocation, as denoted by Facility (ctInitiate.Invoke), to the gateway 122. Upon receipt of this facility message, the gateway 122 sends a setup message with call transfer setup invocation, as denoted by Setup (ctSetup.Invoke), to the gateway 123, so as to establish a call connection toward the gateway 123. The gateway 123 thus returns a connect message with call transfer result, as denoted by Connect(ctSetup.ReturnResult), to the gateway 122, thereby establishing a call connection between the gateways 122 and 123. Furthermore, the gateway 122 in turn issues a release complete message with call transfer return result, as denoted by ReleaseComplete (ctInitiate.Returnresult), back to the gateway 121, indicating that the call transfer has succeeded, thereby releasing the connection between the gateway 121 and 122. Upon receipt of the release complete message, the gateway 121 forwards the received release complete message back to the gateway 13 to finish the requested call transfer.

Finally, the gateway 121 initiates DRQ/DCF (Disengage ReQuest/Disengage ConFirmation) and URQ/UCF (Unregister ReQuest/Unregister ConFirmation) exchanges with a gatekeeper 125 operatively connected thereto, releasing the reserved resources and completing the connection handoff.

In view of the foregoing, it is appreciated that the method and system in accordance with the present invention can provide the handoff function in the H.323-compliant Internet by utilizing the call transfer supplementary service of the existing communication standard. Therefore, only the existing network components are required to effectively offer the VoIP mobility, and a mobile host is able to move freely, while keeping a voice connection with a communication terminal without suffering a broken connection problem. Furthermore, because the communication path does go through the PSTN, the communication cost can be reduced significantly.

Although the present invention has been explained in relation to its preferred embodiment, it is to be understood that many other possible modifications and variations can be made without departing from the spirit and scope of the invention as hereinafter claimed.

What is claimed is:

1. A mobile voice communication method for enabling a mobile host to initiate a voice call with a communication terminal via Internet and cellular networks, said mobile host being connected to said communication terminal through a first mobile switching center of the cellular network, a first gateway at a near end of the Internet, and a second gateway at a far end of the Internet, said method comprising the steps of:

comparing, when said mobile host roams from an area controlled by said first mobile switching center to an area controlled by a second mobile switching center, said first gateway that is connected to said first mobile switching center with a third gateway that is connected to said second mobile switching center; and invoking, if said third gateway and said first gateway are different, a call transfer procedure from said third gateway to said first gateway to establish a connection between said second gateway and said third gateway, and release a connection between said first gateway and said second gateway, wherein said call transfer procedure is invoked by said third gateway in a facility message sent to said first gateway, and wherein said call transfer procedure includes the steps of:

said first gateway sending said facility message with call transfer initiate invocation to said second gateway;

said second gateway sending a setup message with call transfer setup invocation to said third gateway when receiving said facility message;

said third gateway returning a connect message with call transfer result to said second gateway;

said second gateway issuing a release complete message with call transfer return result to said first gateway; and said first gateway forwarding said release complete message to said third gateway when receiving said release complete message.

2. The mobile voice communication method as claimed in claim 1, wherein, before initiating said call transfer procedure, said second mobile switching center sends a location update indication with information of said first gateway to said third gateway for updating location information.

3. The mobile voice communication method as claimed in claim 2, wherein said third gateway is operatively connected to a gatekeeper, and, when receiving said location update indication, said third gateway initiates registration request and confirmation, and admission request and confirmation exchanges with said gatekeeper.

4. The mobile voice communication method as claimed in claim 1, wherein said first gateway is operatively connected to a gatekeeper, and, when said call transfer procedure is completed, said first gateway initiate disengage request and confirmation exchanges with said gatekeeper.

5. The mobile voice communication method as claimed in claim 1, wherein, if said third gateway and said first gateway are identical, a regular location update procedure for mobile communication is performed.

6. A mobile voice communication system for enabling a mobile host to initiate a voice call with a communication terminal via Internet and cellular networks, comprising:

a plurality of mobile switching centers, provided by the cellular network for enabling said mobile host to establish a call connection; and a plurality of gateways, provided by the Internet for connecting to the mobile switching centers, wherein said mobile host is connected to said communication terminal through a first mobile switching center of the cellular network, a first gateway at near end of the Internet, and a second gateway at a far end of the Internet, and when said mobile host roams from an area controlled by said first mobile switching center to an area controlled by a second mobile switching center, and said first gateway that is connected to said first mobile switching center is different from a third gateway that is connected to said second mobile switching center, said third gateway invokes a call transfer procedure to said first gateway, so as to establish a connection between said second gateway and said third gateway, and release a connection between said first gateway and said second gateway, wherein said call transfer procedure is invoked by said third gateway in a facility message sent to said first gateway, and wherein in said call transfer procedure, said first gateway sends said facility message with call transfer initiate invocation to said second gateway; said second gateway sends a setup message with call transfer setup invocation to said third gateway when receiving said facility message; said third gateway returns a connect message with call transfer result to said second gateway; said second gateway issues a release complete message with call transfer return result to said first gateway; and said first gateway forwards said release complete message to said third gateway when receiving said release complete message.

7. The mobile voice communication system as claimed in claim 6, wherein, before initiating said call transfer procedure, said second mobile switching center sends a location update indication with information of said first gateway to said third gateway for updating location information.

8. The mobile voice communication system as claimed in claim 7, wherein said third gateway is operatively connected to a gatekeeper, and, when receiving said location update indication, said third gateway initiates registration request and confirmation, and admission request and confirmation exchanges with said gatekeeper.

9. The mobile voice communication system as claimed in claim 6, wherein said first gateway is operatively connected to a gatekeeper, and, when said call transfer procedure is completed, said first gateway initiate disengage request and confirmation exchanges with said gatekeeper.

* * * * *